United States Patent
Chen et al.

(10) Patent No.: US 9,853,816 B2
(45) Date of Patent: *Dec. 26, 2017

(54) CREDENTIAL VALIDATION

(71) Applicant: Hewlett Packard Enterprise Development LP, Houston, TX (US)

(72) Inventors: Liqun Chen, Bristol (GB); Graeme John Proudler, Bristol (GB)

(73) Assignee: Hewlett Packard Enterprise Development LP, Houston, TX (US)

(*) Notice: Subject to any disclaimer, the term of this patent is extended or adjusted under 35 U.S.C. 154(b) by 69 days.

This patent is subject to a terminal disclaimer.

(21) Appl. No.: 14/995,917

(22) Filed: Jan. 14, 2016

(65) Prior Publication Data

US 2016/0134421 A1    May 12, 2016

Related U.S. Application Data

(63) Continuation of application No. 14/234,334, filed as application No. PCT/US2011/045996 on Jul. 29, 2011, now Pat. No. 9,268,968.

(51) Int. Cl.
| | |
|---|---|
| G06F 21/00 | (2013.01) |
| H04L 9/32 | (2006.01) |
| H04L 9/30 | (2006.01) |
| G06F 21/64 | (2013.01) |

(52) U.S. Cl.
CPC ............ *H04L 9/3234* (2013.01); *G06F 21/64* (2013.01); *H04L 9/3073* (2013.01); *H04L 9/3247* (2013.01)

(58) Field of Classification Search
None
See application file for complete search history.

(56) References Cited

U.S. PATENT DOCUMENTS

| | | |
|---|---|---|
| 7,587,605 B1 | 9/2009 | Venkatesan et al. |
| 2007/0101138 A1 | 5/2007 | Camenisch |
| 2009/0049300 A1 | 2/2009 | Camenisch |
| 2009/0129600 A1 | 5/2009 | Brickell et al. |
| 2009/0210716 A1 | 8/2009 | Chen |
| 2010/0082973 A1 | 4/2010 | Brickell et al. |
| 2010/0161998 A1 | 6/2010 | Chen et al. |
| 2014/0282945 A1 | 9/2014 | Smith et al. |

FOREIGN PATENT DOCUMENTS

| | | |
|---|---|---|
| JP | 2007508765 A | 4/2007 |
| JP | 20080276084 A | 11/2008 |

(Continued)

OTHER PUBLICATIONS

Chen, C., "A DAA Scheme Using Batch Proof and Verification," Trust and Trustworthy Computing, Springer Berlin Heidelberg, Jun. 2010, pp. 166-180.

(Continued)

*Primary Examiner* — David Le
(74) *Attorney, Agent, or Firm* — Hewlett Packard Enterprise Patent Department

(57) ABSTRACT

A message to be signed and a base name point derived from a direct anonymous attestation (DAA) credential may be provided to a device. A signed version of the message and a public key value associated with the base name point may be received in response. Thereafter, the DAA credential may be determined to be valid based on the signed version of the message.

20 Claims, 12 Drawing Sheets

(56) References Cited

FOREIGN PATENT DOCUMENTS

| JP | 2010503252 A | 1/2010 |
|---|---|---|
| WO | WO-2008026086 | 3/2008 |

OTHER PUBLICATIONS

Chen, L. et al, "On the Design and Implementation of an Efficient DAA Scheme," Smart Card Research and Advanced Application, Springer Berlin Heidelberg, 2010, pp. 223-237.
Chen, L. et al., "A note on the Chen-Morrissey-Smart DAA scheme," Information Processing Letters, Jun. 15, 2010, pp. 485-488.
Chen, L. et al., "Lightweight Anonymous Authentication with TLS and DAA for Embedded Mobile Devices," Information Security, Springer Berlin Heidelberg, 2011, pp. 84-98.
Extended European Search Report, dated Mar. 2, 2015, EP Patent Application No. 11870379.2, 7 pages.
International Search Report & Written Opinion received in PCT Application No. PCT/US2011/045996, dated Feb. 23, 2012, 8 pages.

CREDENTIAL VALIDATION

PRIORITY INFORMATION

This application is a continuation of U.S. National Stage application Ser. No. 14/234,334 filed on Jan. 22, 2014, which claims priority to International Application No. PCT/US2011/045996 filed on Jul. 29, 2011. The contents of which are incorporated herein by reference in its entirety.

BACKGROUND

Direct anonymous attestation (DAA) refers to an anonymous (or pseudonymous) authentication scheme intended to enable authentication of an entity without revealing the identity of the entity being authenticated. A typical DAA scheme involves a DAA issuer, a DAA signer (i.e., the entity to be authenticated), and a DAA verifier. An issuer determines that a signer is trusted and, responsive to such verification determination, issues a DAA group membership credential, or DAA credential, to the signer. This negotiation between the issuer and the signer through which the issuer verifies the validity of the signer may be referred to as a DAA join process.

After the signer has been issued a DAA credential, the signer proves its membership in a group of trusted computing platforms to the verifier by signing a message with a DAA signature that is based on the DAA credential issued to the signer and that enables the verifier to verify the validity of the DAA credential without the identity of the signer being revealed. This negotiation between the signer and the verifier through which the verifier verifies the validity of the signer's DAA credential may be referred to as a DAA sign process.

In the typical DAA scheme, the signer splits the task of computing a DAA signature between (i) a principal signer that stores a secret signing key and that has relatively limited computational and storage capabilities but relatively high security assurances and (ii) a secondary signer that has relatively greater computational and storage capabilities. Splitting the signing role between the secure but computationally limited primary signer and the less secure but computationally more powerful secondary signer reduces the burden imposed on the computationally constrained primary signer by offloading some of the processing load to the computationally more powerful secondary signer while also enabling the signer to produce relatively strong and private DAA signatures. When signing a message with a DAA signature, the principal signer signs the message using the secret signing key that it holds, while the secondary signer's contribution is to anonymize the DAA signature. The secondary signer generally is prevented from learning the secret signing key of the principal signer and, consequently, unable to produce a valid DAA signature without collaborating with the primary signer.

As part of the typical DAA join process, the primary signer may execute a series of specialized commands to prove to the secondary signer that the DAA credential issued by the issuer is valid and to provide the secondary signer with a randomizable DAA public key that the secondary signer then can use as part of its role in contributing to the DAA signature. Typically, such specialized commands may be unique to this aspect of the DAA join process and not otherwise performed by the primary signer. Consequently, the need to be able to execute such specialized commands for proving the validity of the DAA credential and generating the randomizable DAA public key may lead to increased computational cost and complexity for the resource constrained primary signer.

DETAILED DESCRIPTION

Techniques that enable verification of the validity of a DAA credential and generation of a randomizable DAA public key by a DAA primary signer for a DAA secondary signer are described herein. Employing these techniques may enable the verification of the validity of the DAA credential and generation of a randomizable DAA public key while eliminating the need for one or more specialized commands that otherwise may be executed to verify the validity of the DAA credential and generate the randomizable DAA public key.

Figure 1:
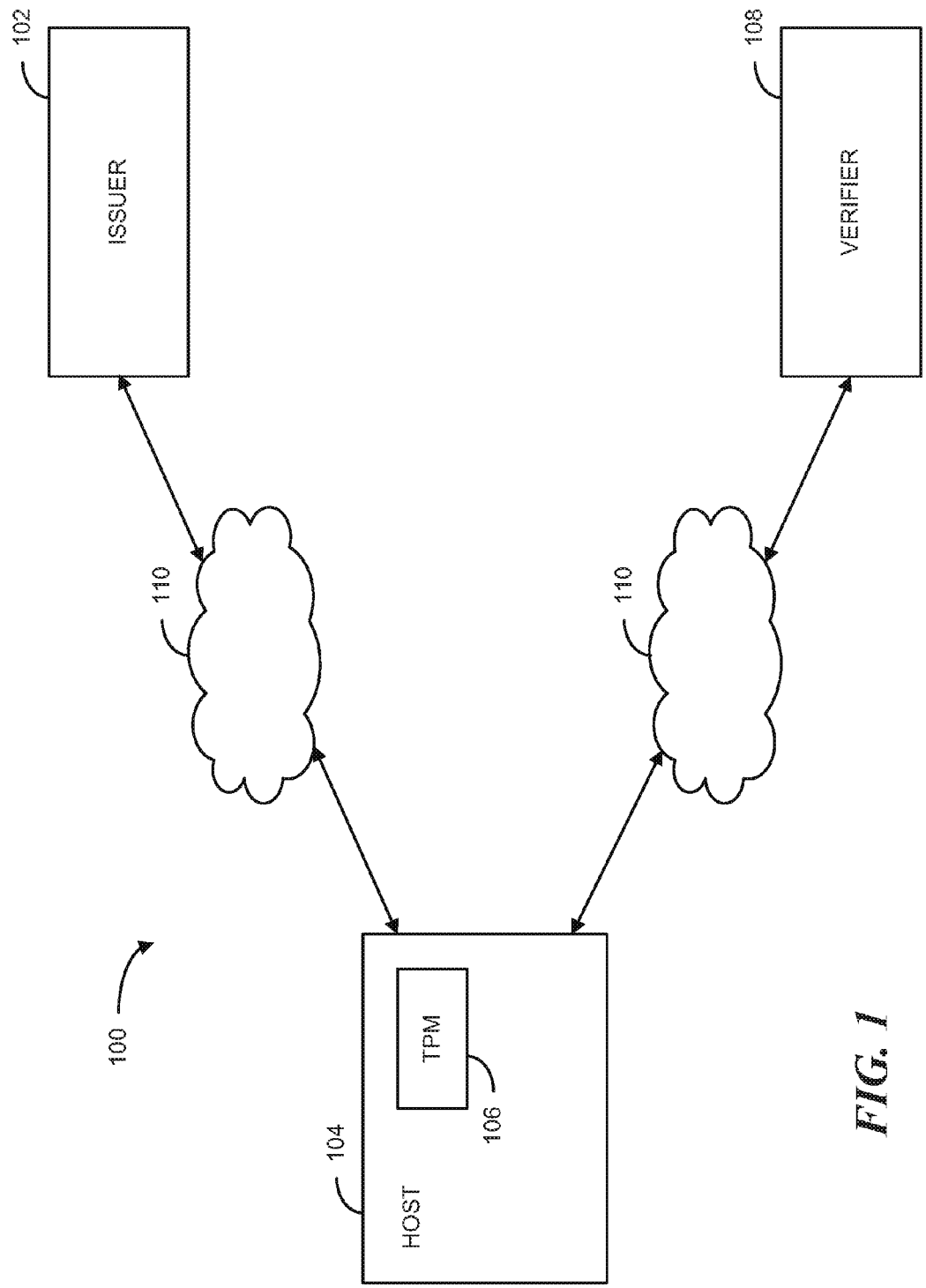
FIG. 1 is a block diagram of an example of a communications system.

FIG. 1 is a block diagram of an example of a communications system 100. For illustrative purposes, several elements illustrated in FIG. 1 and described below are represented as monolithic entities. However, some of these elements may include and/or be implemented on numerous interconnected computing devices and/or other components that are designed to perform a set of specified operations.

As illustrated in FIG. 1, communications system 100 includes a DAA issuer 102, a host computer 104 having a trusted platform module (TPM) 106, which, collectively, may be referred to as a DAA signer, and a DAA verifier 108. Host computer 104 is communicatively coupled to DAA issuer 102 and DAA verifier 108 by a network 110. Network 110 may provide direct or indirect communication links between host computer 104 and DAA issuer 102 as well as between host computer 104 and DAA verifier 108. Examples of network 110 include the Internet, the World Wide Web, wide area networks (WANs) including corporate intranets, local area networks (LANs) including wireless LANs (WLANs), analog or digital wired or wireless telephone networks, radio, television, cable, satellite, and/or any other delivery mechanisms for carrying data, or any combinations thereof.

Each of DAA issuer 102 and DAA verifier 108 may be implemented using one or more computing devices (e.g., servers). The one or more computing devices on which DAA issuer 102 is implemented and the one or more computing devices one which DAA verifier 108 are implemented may have internal or external storage components storing data and programs such as an operating system and one or more application programs. The one or more application programs stored in the storage components of the one or more computing devices on which DAA issuer 102 is implemented may include instructions that, when executed, cause the one or more computing devices to provide the features of the DAA issuer 102 described herein. Similarly, the one or more application programs stored in the storage components of the one or more computing devices on which DAA verifier 108 is implemented may include instructions that, when executed, cause the one or more computing devices to provide the features of the DAA verifier 108 described herein. Furthermore, the one or more computing devices on which the DAA issuer 102 and the one or more computing devices on which the DAA verifier 108 are implemented each may include one or more processors for executing instructions stored in storage and/or received from one or more other electronic devices, for example over network 110. In addition, these computing devices also may include network interfaces and communication devices for sending and receiving data.

Host computer 104 may be any of a number of different types of computing devices including, for example, a personal computer, a special purpose computer, a general purpose computer, a combination of a special purpose and a general purpose computing device, a laptop computer, a tablet computer, a netbook computer, a smart phone, a mobile phone, a personal digital assistant, and a portable media player. Host computer 104 typically has internal or external storage components for storing data and programs such as an operating system and one or more application programs. Host computer 104 also typically includes a central processing unit (CPU) for executing instructions stored in storage and/or received from one or more other electronic devices, for example over network 110. In addition, host computer 104 also usually includes one or more communications devices for sending and receiving data. One example of such a communications device is a modem. Other examples include an antenna, a transceiver, a communications card, and other types of network adapters capable of transmitting and receiving data over network 110 through a wired or wireless data pathway.

TPM 106 is integrally installed within host computer 104. For example, TPM 106 may be embedded in hardware within the housing of host computer 104. More particularly, in some implementations, TPM 106 may be embedded within or physically bonded to the motherboard of host computer 104. Furthermore, TPM 106 generally may be a physically secure hardware device (e.g., a tamper-resistant chip) that includes one or more physical mechanisms designed to provide higher levels of security than may be possible through software alone. TPM 106 includes computer storage for, among other purposes, storing one or more cryptographic keys. In addition, TPM 106 has processing capabilities and is capable of performing computational tasks (e.g., including cryptographic functionalities), though the processing capabilities of TPM 106 may be less than the processing capabilities of host computer 104. In some implementations, TPM 106 may be communicatively coupled to host computer 104 by a low-bandwidth, Low Pin Count (LPC) bus interface.

When implementing a DAA scheme, issuer 102 tests the legitimacy of host computer 104 and its associated TPM 106 and, responsive to verifying that host computer 104 and its associated TPM 106 are legitimate (e.g., by verifying that TPM stores a DAA secret), issues host computer 104 a DAA credential. The host computer 104 and its associated TPM 106 then can prove their legitimacy to verifier 108 by providing a DAA signature to verifier 108 that is based on the DAA secret stored by the TPM 106 and the DAA credential issued to host computer 104 by issuer 102.

The role of computing this DAA signature is split between host computer 104 and TPM 106. As will be described in greater detail below, TPM 106 represents the primary signer and stores a DAA secret and a DAA secret signing key. Meanwhile, host computer 104 operates as the secondary signer and assists TPM 106 in computing the DAA signature in order to maintain the anonymity (or pseudonymity) of host computer 104. Host computer 104 may be prevented from learning the DAA secret and the secret signing key stored by TPM 106, and, consequently, host computer 104 may be unable to produce a valid DAA signature without TPM 106.

After receiving a DAA signature from host computer 104, verifier 108 tests the signature to determine whether host computer 104 and it associated TPM 106 are in possession of a valid DAA credential and, responsive to verifying that host computer 104 and its associated TPM 106 are in possession of a valid DAA credential, confirms the authenticity of host computer 104. While verifier 108 may be able to verify that host computer 104 and its associated TPM 106 are in possession of a valid DAA credential, verifier 108 may be unable to determine the identity of host computer 104.

Figure 2:
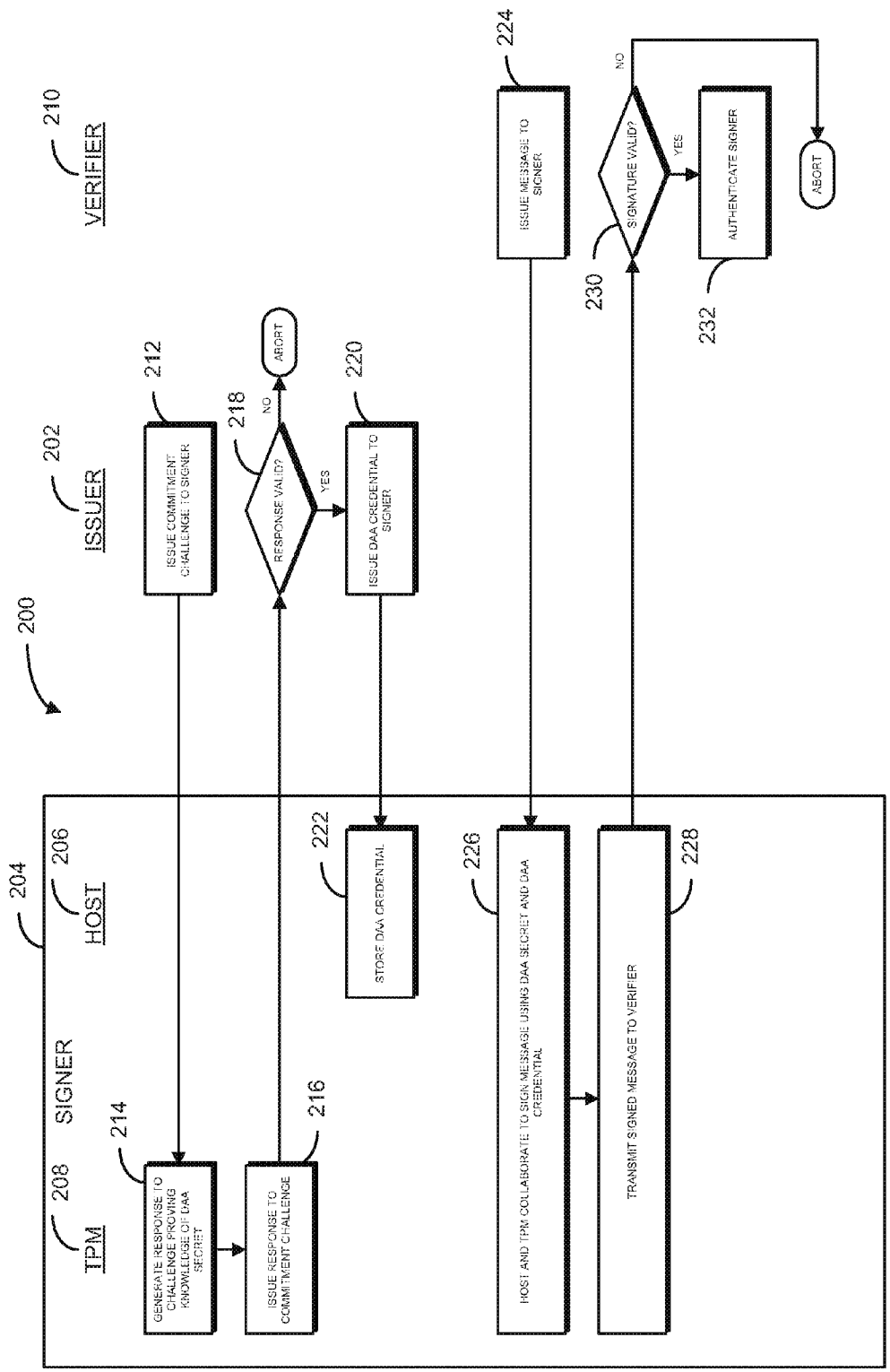
FIG. 2 is a flow chart that illustrates aspects of an example of an overall DAA process.

FIG. 2 is a flow chart 200 that illustrates aspects of an example of an overall DAA process. The process illustrated in the flowchart 200 of FIG. 2 is performed by a DAA issuer 202 (e.g., DAA issuer 102 of FIG. 1), a DAA signer 204 (implemented jointly by a host computer 206 (e.g., host computer 104 of FIG. 1) and a TPM 208 (e.g., TPM 106 of FIG. 1), and a DAA verifier 210 (e.g., DAA verifier 108 of FIG. 1).

At 212, DAA issuer 202 issues a commitment challenge to DAA signer 204. In particular, DAA issuer 202 issues a challenge to DAA signer 204. DAA signer 204 receives the commitment challenge from DAA issuer 202 and, at 214, TPM 208 uses a DAA secret key derived from a DAA secret stored within TPM 208 to generate a response to the commitment challenge proving that DAA signer 204 has knowledge of the DAA secret and a private endorsement key and, therefore, is a valid TPM that is to be trusted by issuer 202. At 216, TPM 208 then issues a response to the commitment challenge to DAA issuer 202. DAA issuer 202 receives the response and, at 218, checks the response to determine if the response is valid. That is to say, DAA issuer 202 checks the response to determine if the response proves that DAA signer 204 has knowledge of the DAA secret and the private endorsement key and, therefore, is to be trusted by DAA issuer 202. Responsive to verifying that DAA signer 204 has knowledge of the DAA secret and the private endorsement key, at 220, DAA issuer 202 issues DAA signer 204 a DAA credential, which host computer 206 stores at 222. In contrast, if, at 218, DAA issuer 202 determines that the response received from DAA signer was invalid, DAA issuer 202 may abort the process.

After DAA signer 204 has received its DAA credential from DAA issuer 202, DAA signer 204 may use the DAA credential to prove its legitimacy to DAA verifier 210. For example, at 224, DAA verifier 210 may issue a message to DAA signer 204, requesting that DAA signer 204 sign the message with a DAA signature computed based on the DAA secret signing key stored by TPM 208 and the DAA credential stored by the host computer 206 in order to prove the legitimacy of DAA signer 204 to DAA verifier 210. Responsive to receiving the message issued by DAA verifier 210, at 226, TPM 208 and host computer 206 of DAA signer 204 collaborate to sign the message with a DAA signature computed using the DAA secret key stored within TPM 208 and the DAA credential stored by host computer 206. Then, at 228, DAA signer 228 transmits the signed message to DAA verifier 210.

DAA verifier 210 receives the signed message and, at 230, checks the signed message to determine if the DAA signature used to sign the message is valid. That is to say, DAA verifier 210 checks the signed message to determine if the DAA signature proves that DAA signer 204 is in possession of a valid DAA credential and the DAA secret signing key. Responsive to verifying that DAA signer 204 is in possession of a valid DAA credential and the DAA secret signing key, at 232, DAA verifier 210 authenticates DAA signer 204. In contrast, if, at 230, DAA verifier 210 determines that the DAA signature used to sign the message does not prove that DAA signer is in possession of a valid DAA credential, DAA verifier 210 may abort the process.

FIGS. 3A-3D are flow charts that illustrate aspects of example initialization processes for a DAA scheme involving a DAA issuer (e.g., DAA issuer 102 of FIG. 1), a DAA signer (e.g., host computer 104 and its associated TPM 106 of FIG. 1), and a DAA verifier (e.g., DAA verifier 108 of FIG. 1). In particular, the flow charts of FIGS. 3A-3D illustrate aspects of processes that establish public parameters for various different protocols of the DAA scheme and that establish the long term parameters for the DAA issuer.

Figure 3A:
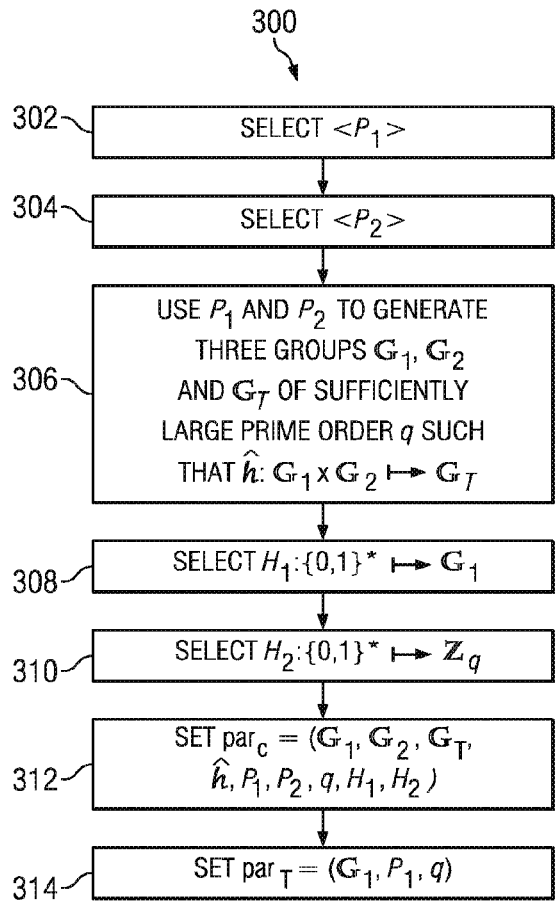
FIGS. 3A-3D are flow charts that illustrate aspects of example initialization processes for a DAA scheme.

FIG. 3A is a flowchart 300 that illustrates aspects of establishing the commitment parameters $par_C$ for a DAA scheme. The process illustrated in the flowchart 300 of FIG. 3A may be performed by the DAA issuer involved in the DAA scheme itself (e.g., DAA issuer 102 of FIG. 2). Additionally or alternatively, the process illustrated in the flowchart 300 of FIG. 3A may be performed by a trusted organization (e.g., a trusted standards organization). At 302, a first elliptic curve point $P_1$ is selected at random, and, at 304, a second elliptic curve point $P_2$ is selected at random. Then, at 306, $P_1$ and $P_2$ are used to generate three groups $\mathbb{G}_1$, $\mathbb{G}_2$, and $\mathbb{G}_T$ of sufficiently large prime order q such that a pairing $\hat{h}$: $\mathbb{G}_1 \times \mathbb{G}_2 \mapsto \mathbb{G}_T$. Then, at 308, a first hash function $H_1$: $\{0,1\}^* \mapsto \mathbb{G}_1$ is selected, and, at 210, a second hash function $H_2$: $\{0,1\}^* \mapsto \mathbb{Z}$ is selected, where the notation $\{0,1\}^*$ represents a set of binary strings of arbitrary length. Thereafter, at 312, the commitment parameters $par_C$ are set as $par_C=(\mathbb{G}_1, \mathbb{G}_2, \mathbb{G}_T, \hat{h}, P_1, P_2, q, H_1, H_2)$. Finally, at 314, a subset of the commitment parameters $par_C$ are set as $par_T=(\mathbb{G}_1, P_1, q)$. $par_T$ then may be installed on the TPM (e.g., instead of the entire set of commitment parameters $par_C$).

Figure 3B:
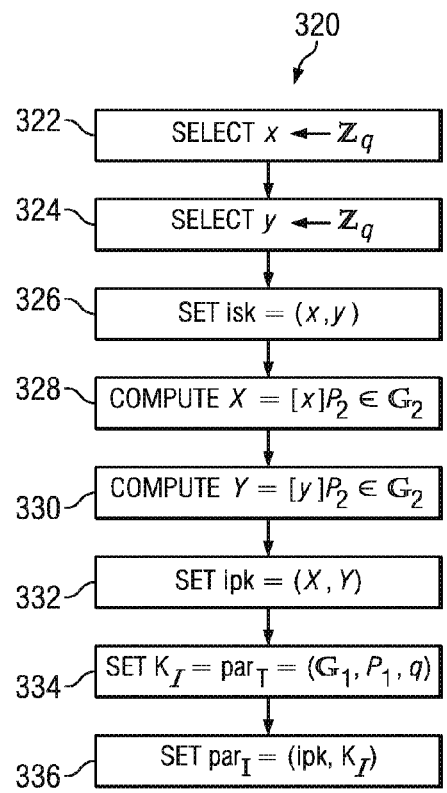

FIG. 3B is a flowchart 320 that illustrates aspects of establishing the DAA issuer parameters $par_I$ for the DAA issuer involved in the DAA scheme. The process illustrated in the flowchart 320 of FIG. 3B may be performed by the DAA issuer involved in the DAA scheme itself (e.g., DAA issuer 102 of FIG. 1). At 322, a first integer $x \leftarrow \mathbb{Z}_q$ is selected (where the operation $x \leftarrow S$ represents the act of sampling S at random and assigning the result to the variable x) and, at 324, a second integer $y \leftarrow \mathbb{Z}_q$ is selected. Then, at 326, the issuer's private signing key isk is set to isk=(x,y). In order to generate the issuer's public signing key ipk, at 328, the value $X=[x]P_2 \in \mathbb{G}_2$ is computed (where the operation [x]P represents the scalar multiplication of an elliptic curve point P by some integer x), and, at 330, the value $Y=[y]P_2 \in \mathbb{G}_2$ is computed. Then, at 332, the issuer's public signing key ipk is set as ipk=(X,Y). At 334, issuer value $K_I$ is set to $K_I=par_T=(\mathbb{G}_1, P_1, q)$. Finally, at 336, the issuer parameters $par_I$ are set to $par_I=(ipk, K_I)$.

Figure 3C:
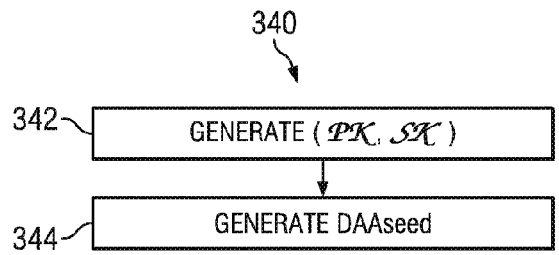

FIG. 3C is a flowchart 340 that illustrates aspects of establishing the TPM parameters for a TPM involved in the DAA scheme (e.g., TPM 106 of FIG. 1). The process illustrated in the flowchart 340 of FIG. 3C may be performed by the TPM involved in the DAA scheme itself (e.g., TPM 106 of FIG. 1). Additionally or alternatively, the process illustrated in the flowchart 340 of FIG. 3C may be performed by a trusted organization (e.g., a trusted standards organization). At 342, a public/private endorsement key pair ($\mathcal{PK}$, $\mathcal{SK}$) is generated and stored by the TPM. At 344, the private DAA secret value DAAseed is generated (e.g., using a TPM internal random number generator). This DAAseed value subsequently may be used by the TPM to generate one or more DAA secret keys that the TPM may use as part of proving its authenticity to a DAA issuer and/or a DAA verifier.

Figure 3D:
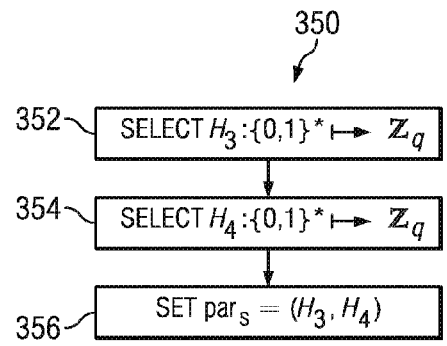

FIG. 3D is a flowchart 350 that illustrates aspects of establishing the signature and verification parameters $par_S$ for a DAA scheme. The process illustrated in the flowchart 350 of FIG. 3D may be performed by the DAA issuer involved in the DAA scheme itself (e.g., DAA issuer 102 of FIG. 2). Additionally or alternatively, the process illustrated in the flowchart 350 of FIG. 3D may be performed by a trusted organization (e.g., a trusted standards organization). At 352, a third hash function $H_3$: $\{0,1\} \mapsto \mathbb{Z}_q$ is selected, and, at 354, a fourth hash function $H_4$: $\{0,1\}^* \mapsto \mathbb{Z}_q$ is selected. Then, at 356, the signature and verification parameters $par_S$ are set to $par_S=(H_3, H_4)$.

After the processes illustrated in the flowcharts 300, 320, 340, and 350 of FIGS. 3A, 3B, 3C, and 3D, respectively, have been performed, and the parameters $par_C$, $par_I$, $par_T$, and $par_S$ have been established, these parameters then may be made available to the DAA issuer (e.g., DAA issuer 102 of FIG. 1), the DAA signer (e.g., DAA signer 104 of FIG. 1), and the DAA verifier (e.g., DAA verifier 108 of FIG. 1) involved in the DAA scheme.

FIGS. 4A-4E show a flowchart 400 that illustrates aspects of an example DAA join process within an overall DAA scheme. The process illustrated in the flowchart 400 of FIGS. 4A-4E is performed by a DAA issuer 402 (e.g., DAA issuer 102 of FIG. 1) and a host computer 404 and TPM 406 of a DAA signer (e.g., host computer 104 and TPM 106 of FIG. 1) after the public parameters for the DAA scheme have been established, for example via performance of the processes illustrated in the flowcharts 300, 320, 340, and 350 of FIGS. 3A, 3B, 3C, and 3D, respectively.

At 4002, a secret key $k_m$ is selected at random from a key space $\mathcal{MK}$ of a message authentication code (MAC) algorithm, and, at 4004, the public key $\mathcal{PK}$ of the TPM 406 is used to encrypt $k_m$ (e.g., using an indistinguishability of chosen cipher text attack (IND-CCA) encryption scheme) yielding $c_I$. In addition, at 4006, a nonce $n_I$ is selected at random from a set of binary strings of length t. At 4008, a commitment challenge based on $c_I$ and $n_I$ then is formed, and, at 4010, the commitment challenge is transmitted to host computer 404, which, in turn, transmits the commitment challenge to TPM 406 at 4012.

TPM 406 receives the commitment challenge and, as described in greater detail below, returns a signature on the commitment challenge of the DAA issuer 402 that is based on a DAA secret key derived from the DAAseed value stored in TPM 406 and that demonstrates to DAA issuer 402 that TPM 406 and its associated host computer 404 are to be trusted by the DAA issuer 402. In particular, at 4014, TPM 406 computes a private elliptic curve DAA (ECDAA) key $sk_T$ by applying a pseudorandom function to (DAAseed$\|K_1\|$cnt) (i.e., the concatenation of DAAseed, $K_I$ and cnt (e.g., a value signifying a number of keys to be generated)). In addition, at 4016, TPM 406 decrypts $c_I$ from the commitment challenge using its private key $\mathcal{SK}$ yielding $k_m$. Then, at 4018, TPM 406 checks if $k_m=\perp$. If $k_m=\perp$, the process is aborted. Alternatively, if $k_m \neq \perp$, then the process continues to 4020, where TPM 406 computes a signature F that demonstrates to DAA issuer 402 that TPM 406 and its associated host computer 404 are to be trusted by multiplying $sk_T$ by elliptic curve point $P_1$.

Figure 4A:
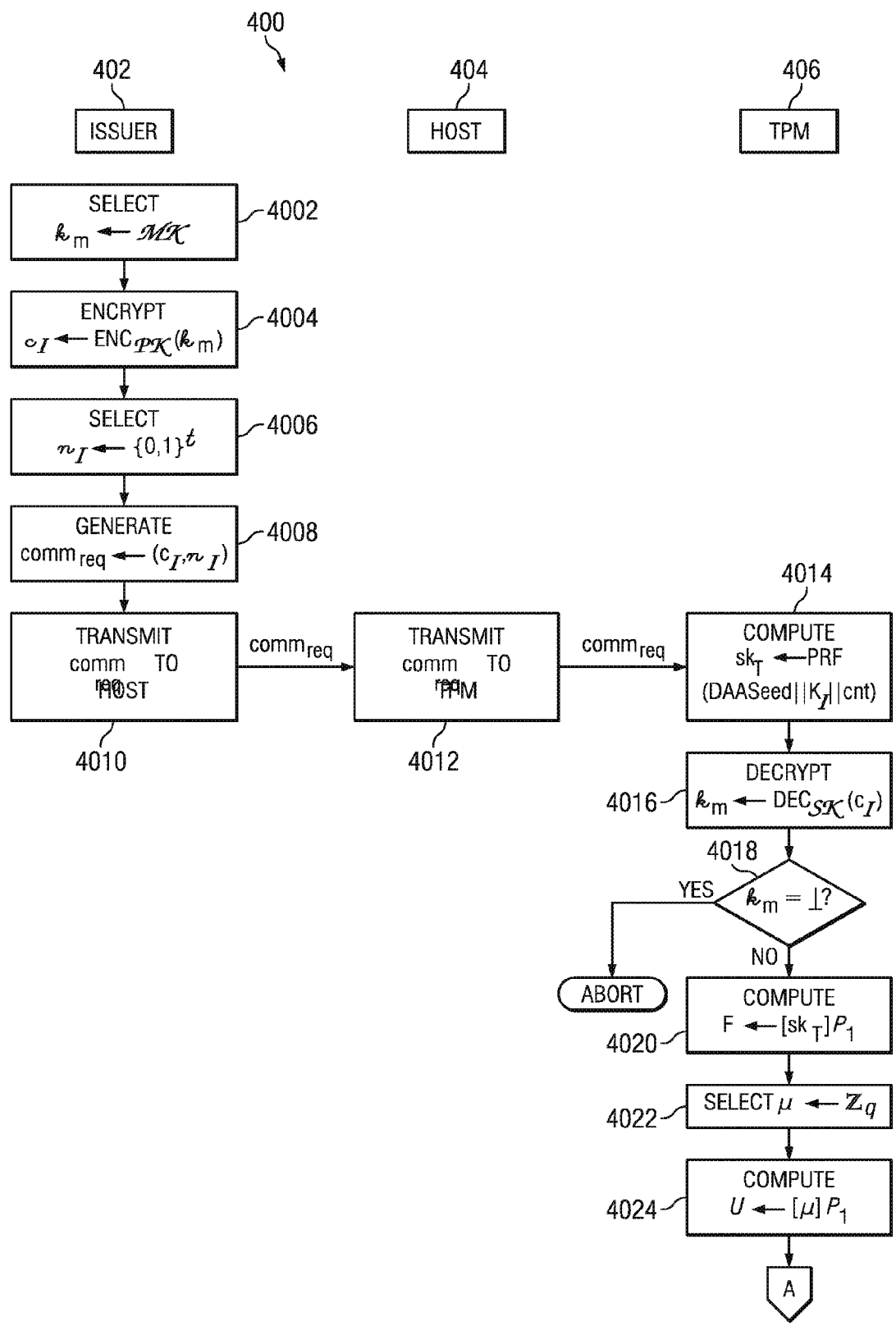
FIGS. 4A-4E and FIG. 6 are flowcharts that illustrate aspects of example DAA join processes.
Figure 4B:
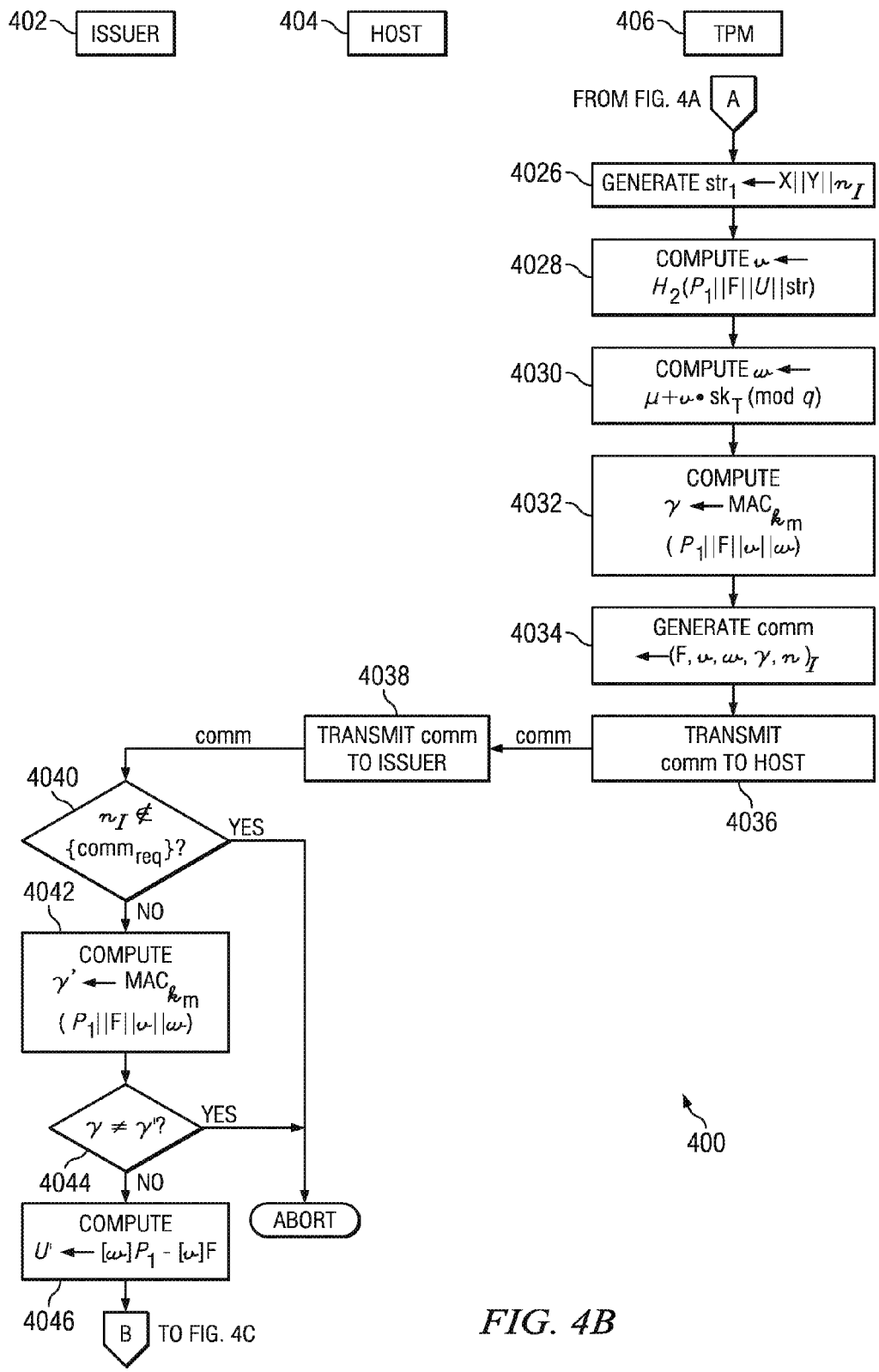

At 4022, TPM 406 selects a value μ at random from $\mathbb{Z}_q$ and, at 4024, TPM computes U by multiplying μ by elliptic curve point $P_1$. Referring now to FIG. 4B, TPM 406 proceeds to generate $str_1$ at 4026 by concatenating the public keys X and Y of DAA issuer 402 with $n_I$ of the commitment challenge. In addition, at 4028, TPM 406 computes v by applying hash function $H_2$ to ($P_1$∥F∥U∥$str_1$). Thereafter, at 4030, TPM 406 computes w←u+v·$sk_T$(mod q), and, at 4032, TPM 406 generates γ by applying the MAC algorithm to encrypt the message ($P_1$∥F∥v∥w) using the secret signing key $k_m$. Then, at 4034, TPM 406 generates a commitment by packaging F, v, w, γ, and $n_I$ together, and, at 4036, TPM 406 transmits the commitment to host computer 404. Host computer 404 receives the commitment from TPM 406 and, at 4038, transmits the commitment to DAA issuer 402.

DAA issuer 402 receives the commitment and, as described in greater detail below, verifies, based on the received commitment, that TPM 406 and its associated host computer 404 belong to a group of trusted computing platforms. In particular, at 4040, DAA issuer 402 checks if $n_I$ from the received commitment is the same $n_I$ as from the commitment challenge. If $n_I \in \{comm_{req}\}$ is true, DAA issuer 402 aborts the process. In contrast, if $n_I \notin \{comm_{req}\}$ is false, DAA issuer 402 proceeds to 4042, where DAA issuer 402 generates γ' by applying the MAC algorithm to encrypt the message using the secret signing key $k_m$. Thereafter, at 4044, DAA issuer 402 checks if γ' is the same as the value γ included within the commitment. If γ≠γ' is true, DAA issuer 402 aborts the process. If γ≠γ' is false, DAA issuer 402 proceeds to 4046, where DAA issuer 402 computes U'←[w]$P_1$−[v]F.

Figure 4C:
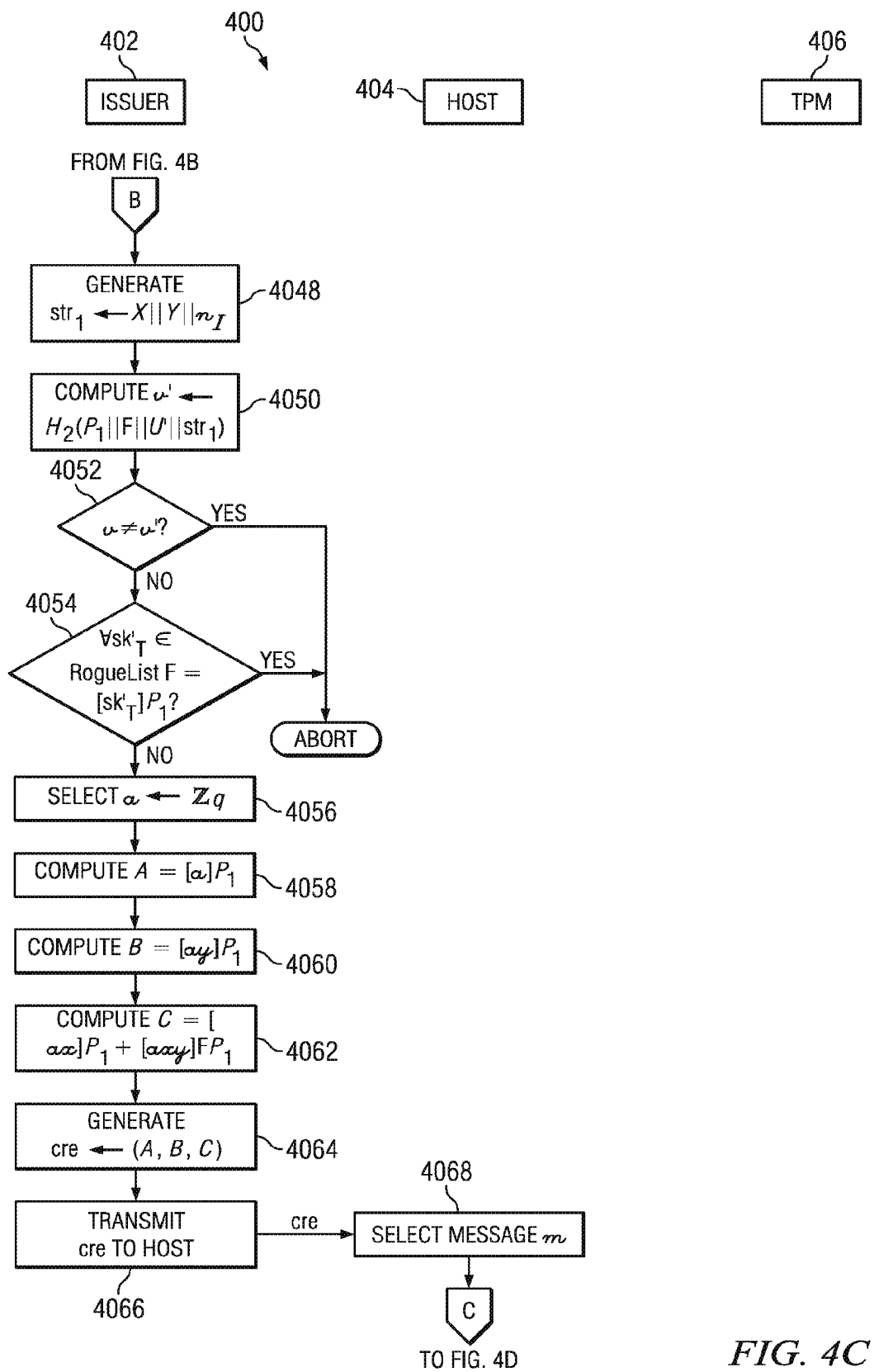
Figure 4D:
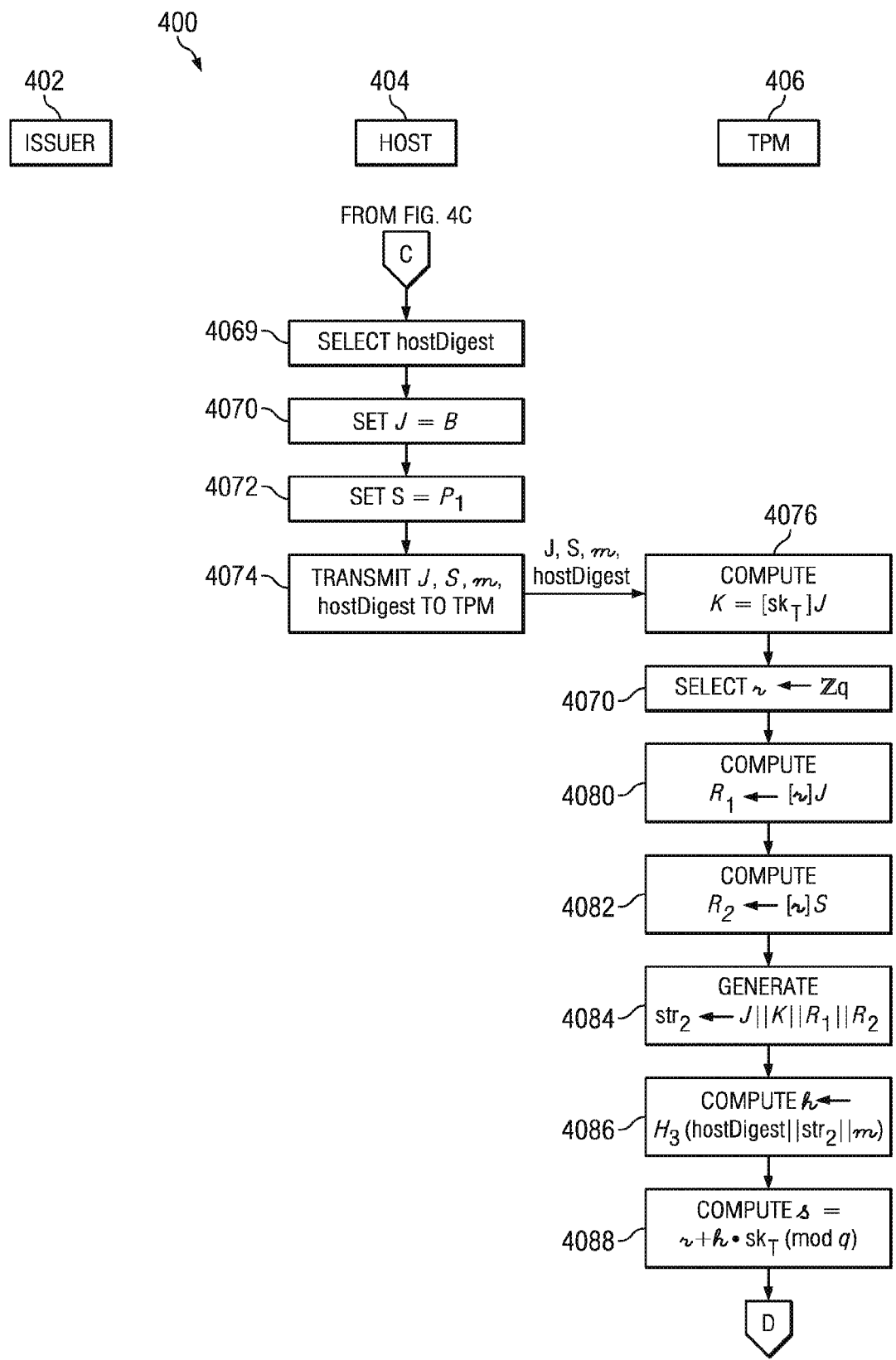

Referring now to FIG. 4C, at 4048, DAA issuer 402 proceeds to generate its own version of $str_1$ by concatenating its public keys X and Y with $n_I$. Then, at 4050, DAA issuer 402 computes v' by applying hash function $H_2$ to ($P_1$∥F∥U'∥$str_1$). Thereafter, at 4052, DAA issuer 402 determines if TPM 406 and its associated host computer 404 are to be trusted by DAA issuer 402 by checking if the value of v' is the same as the value of v from the received commitment challenge. If v≠v' is true, DAA issuer 402 determines that TPM 406 does not hold a valid DAA secret key and, therefore, that TPM 406 and its associated host computer 404 are not members of a group of trusted computing platforms. Consequently, DAA issuer 402 aborts the process. In contrast, if v≠v' is false, DAA issuer 402 determines that TPM 406 holds a valid DAA secret key and, therefore, that TPM 406 and its associated host computer 404 are to be trusted by DAA issuer 402. Consequently, DAA issuer 402 proceeds to 4054, where DAA issuer 402 checks to confirm that the DAA secret key held by TPM 406 is not known to have been compromised. In particular, for every DAA secret key $sk'_T$ included in a RogueList of DAA secret keys known to have been compromised, DAA issuer 402 checks whether the value of F from the received commitment matches [$sk'_T$]$P_1$. If F=[$sk'_T$]$P_1$ is true for any DAA secret key $sk'_T$ included in the RogueList of DAA secret keys known to have been compromised, DAA issuer 402 determines that the DAA secret key held by TPM 406 has been compromised and, therefore, aborts the process. In contrast, if F=[$sk'_T$]$P_1$ is false for all of the DAA secret keys $sk'_T$ included in the RogueList, DAA issuer 402 determines that the DAA secret key held by TPM 406 is not known to have been compromised and, therefore, DAA issuer 402 proceeds with the process.

Having verified that the DAA secret key held by TPM 406 is a valid DAA secret key and that the DAA secret key held by TPM 406 is not known to have been compromised, DAA issuer 402 sets about generating a DAA credential for the host computer 404 associated with TPM 406. In particular, at 4056, DAA issuer 402 selects a value a at random from $\mathbb{Z}_q$. Thereafter, DAA issuer 402 computes A=[a]$P_1$ at 4058, B=[ay]$P_1$ at 4060, and C=[ax]$P_1$+[axy]F at 4062. DAA issuer 402 then generates a DAA credential for the host computer 404 associated with TPM 406 at 4064 by packaging A, B, and C together, and, at 4055, DAA issuer 402 transmits the resultant DAA credential to host computer 404.

As part of completing the DAA join process illustrated in the flowchart 400, the host computer 404 then collaborates with TPM 406 to verify that the DAA credential received from DAA issuer 402 is valid and to generate a randomizable public key that the host computer 404 can use to make contributions to a DAA signature. As described in greater detail below, in one implementation, host computer 404 requests that TPM 406 execute a sign protocol to verify that the DAA credential received from DAA issuer 402 is valid and to generate a randomizable public key for the host computer 404. This sign protocol may be the same as (or substantially similar to) the sign protocol that the TPM 406 executes to make its contribution to a DAA signature to be used to authenticate the TPM 406 and it associated host computer 404 to a DAA verifier.

More particularly, at 4068, host computer 404 generates a message m to be signed by TPM 406. For example, host computer 404 may generate an arbitrary message m or host computer 404 may randomly choose a message m to be signed by TPM 406. In addition, referring now to FIG. 4D, at 4069, host computer 404 selects a value for hostDigest, which may be an arbitrary or randomly chosen data string, and, at 4070, host computer 404 sets the base name point J equal to the value of B from the DAA credential received from DAA issuer 402. In addition, at 4072, host computer 404 sets membership point S equal to $P_1$. Thereafter, at 4074, host computer 404 transmits J, S, the message m, and hostDigest to TPM 406 and requests TPM 406 to execute a DAA sign protocol to sign the message.

Figure 4E:
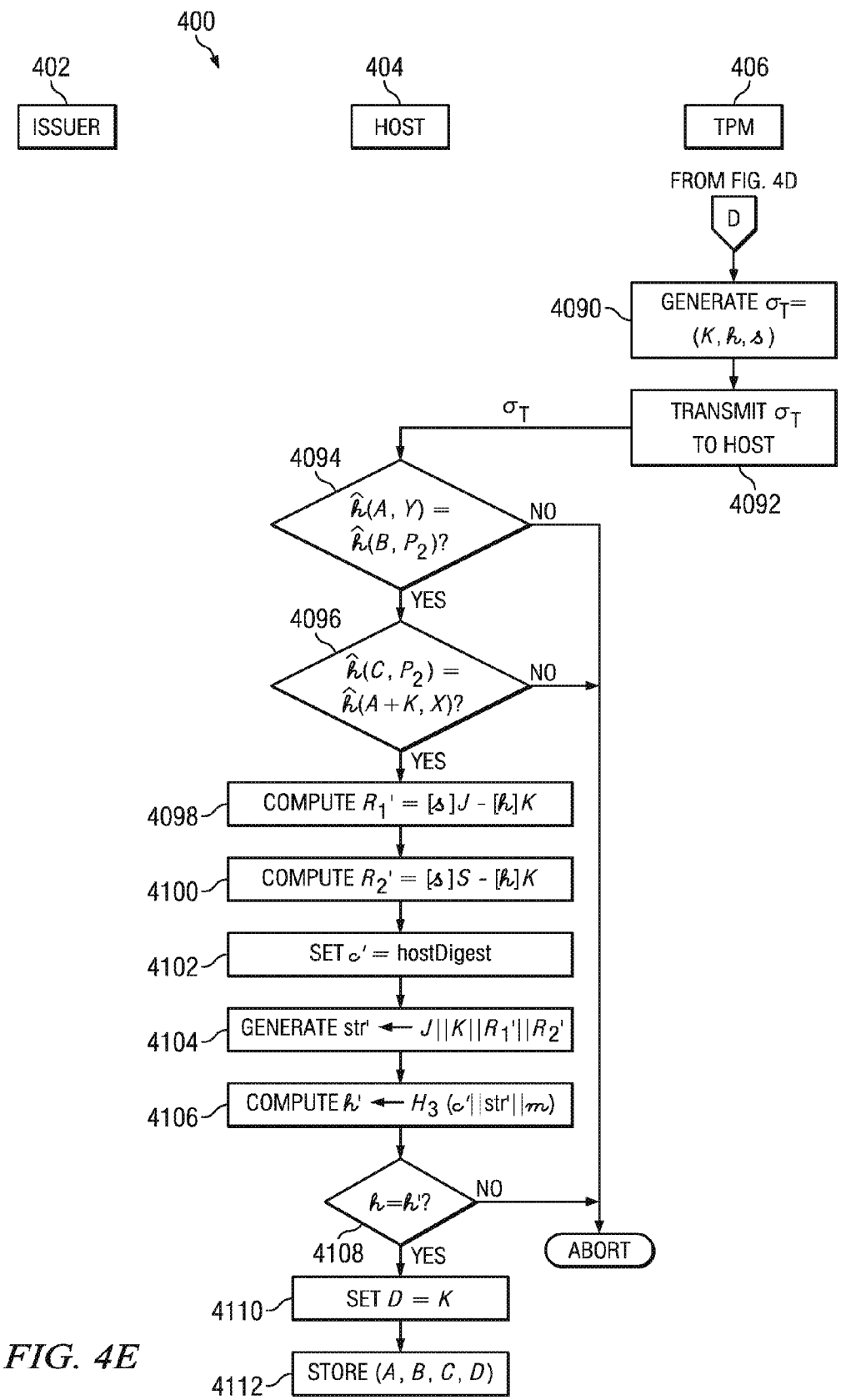

TPM 406 receives J, S, the message m, and hostDigest and sets about executing the DAA sign protocol to sign the message m. In particular, at 4076, TPM 406 computes a signature K by multiplying $sk_T$ by J. Thereafter, TPM 406 selects a value r at random from $\mathbb{Z}_q$ at 4078, computes a value $R_1$ by multiplying r times J at 4080, and computes a value $R_2$ by multiplying r times S at 4082. Then, TPM 406 generates $str_2$ by concatenating J, K, $R_1$, and $R_2$ at 4084, computes h by applying hash function $H_3$ to (hostDigest∥$str_2$∥m) at 4086, and computes s=r+h·$sk_T$(mod$_q$) at 4088. Referring now to FIG. 4E, TPM 406 generates a signature $\sigma_T$ by packaging K, h, and s together at 4090, and, transmits the signature $\sigma_T$ to host computer computer 404 at 4092.

Host computer 404 receives the signature $\sigma_T$ and sets about using the signature $\sigma_T$ to determine if the DAA credential received from DAA issuer 402 is valid. In particular, at 4094, host computer 404 checks if ĥ(A,Y)=ĥ(B, $P_2$). If ĥ(A,Y)≠ĥ(B,$P_2$), host computer 404 determines that the DAA credential received from DAA issuer 402 is invalid and, therefore, aborts the process. In contrast, if ĥ(A,Y)=ĥ(B, $P_2$), host computer 404 proceeds to 4096, where host computer 404 checks if ĥ(C,$P_2$)=ĥ(A+K,X). If ĥ(C,$P_2$)≠ĥ(A+K,X), host computer 404 determines that the DAA credential received from DAA issuer 402 is invalid and, therefore, aborts the process. In contrast, if ĥ(C,$P_2$)=ĥ(A+K,X), host computer 404 proceeds to 4098, where host computer 404 computes R'$_2$=[s]J−[h]K.

In addition, at 4100, host computer 404 computes R'$_2$=[s]S−[h]K, and, at 4102, host computer 404 sets c'=hostDigest. Then, host computer 404 generates str' by concatenating J, K, R'$_1$, and R'$_2$ at 4104, and computes h' by applying hash function H$_3$ to (c'||str'||m) at 4106. Thereafter, at 4108, host computer 404 checks if h (from signature $\sigma_T$) matches h'. If h≠h', then host computer 404 determines that the DAA credential received from DAA issuer 402 is invalid and aborts the process. In contrast, if h=h', host computer 404 determines that the DAA credential received from DAA issuer 402 is valid and, therefore, proceeds to 4110, where host computer 404 sets randomizable public key value D equal to the value of K received in the signature $\sigma_T$ returned by TPM 406. Thereafter, at 4112, host computer 404 stores (A, B, C, D) as the DAA credential associated with the DAA secret signing key sk$_T$ held by TPM 406. After completing the process illustrated in the flowchart 400 of FIGS. 4A-4E, host computer 404 and its associated TPM 406 can use the DAA secret signing key sk$_T$ held by TPM 406 and the DAA credential (A, B, C, D) stored by host computer 404 to compute DAA signatures to authenticate host computer 404 and its associated TPM 406 to a DAA verifier as part of a DAA sign process.

Figure 5A:
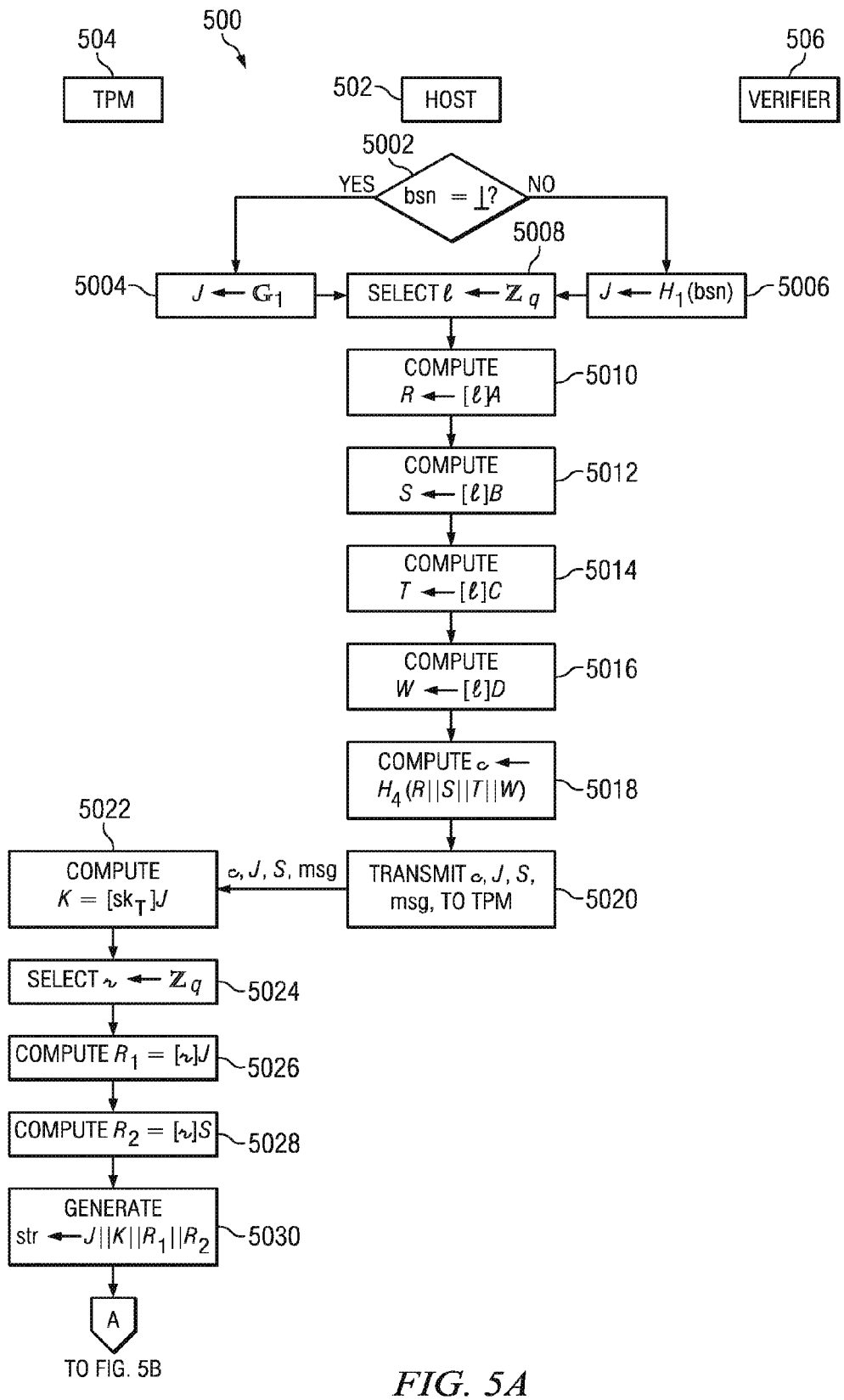
FIGS. 5A-5C are flowcharts that illustrate aspects of an example DAA sign process.
Figure 5B:
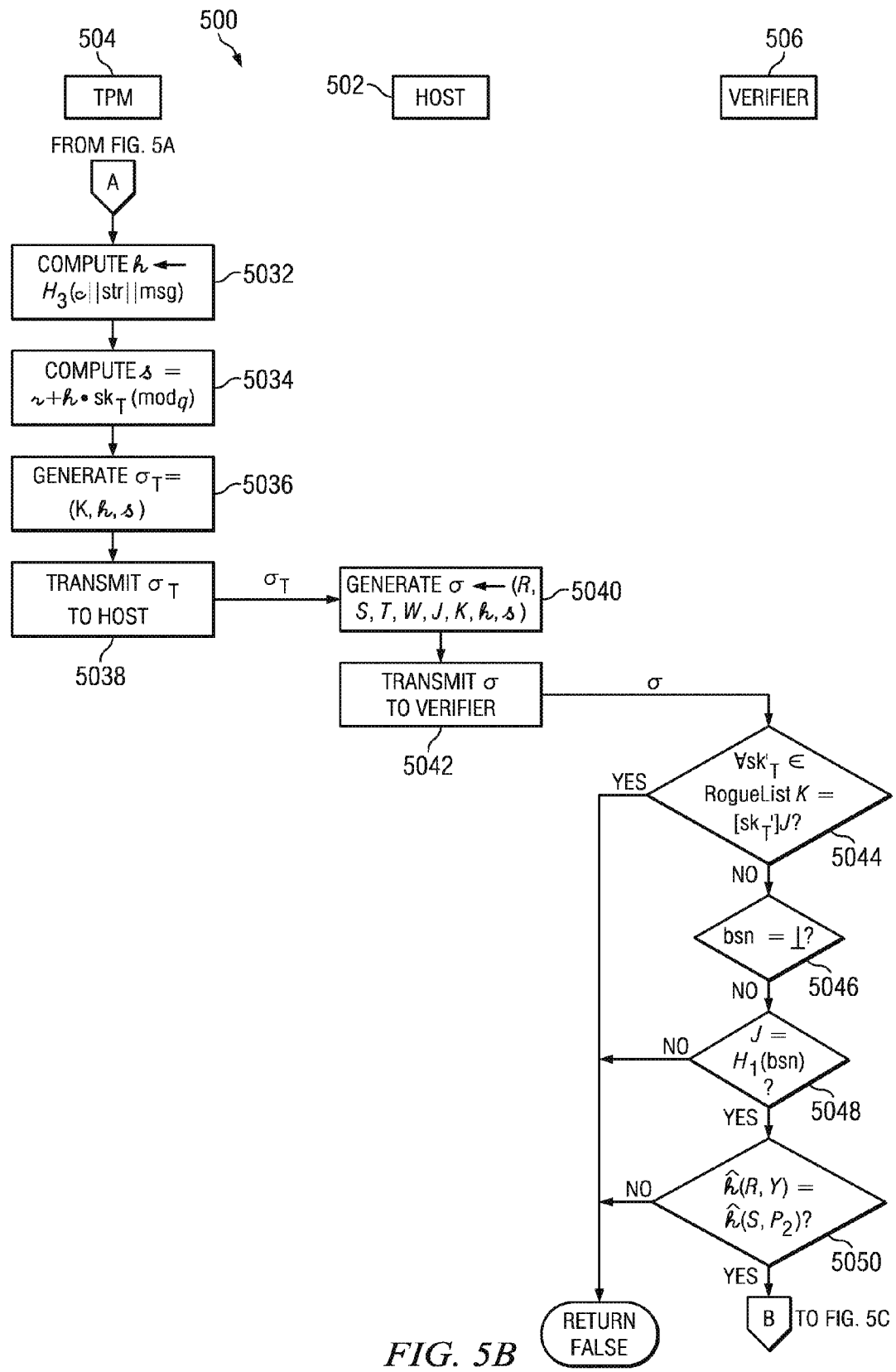
Figure 5C:
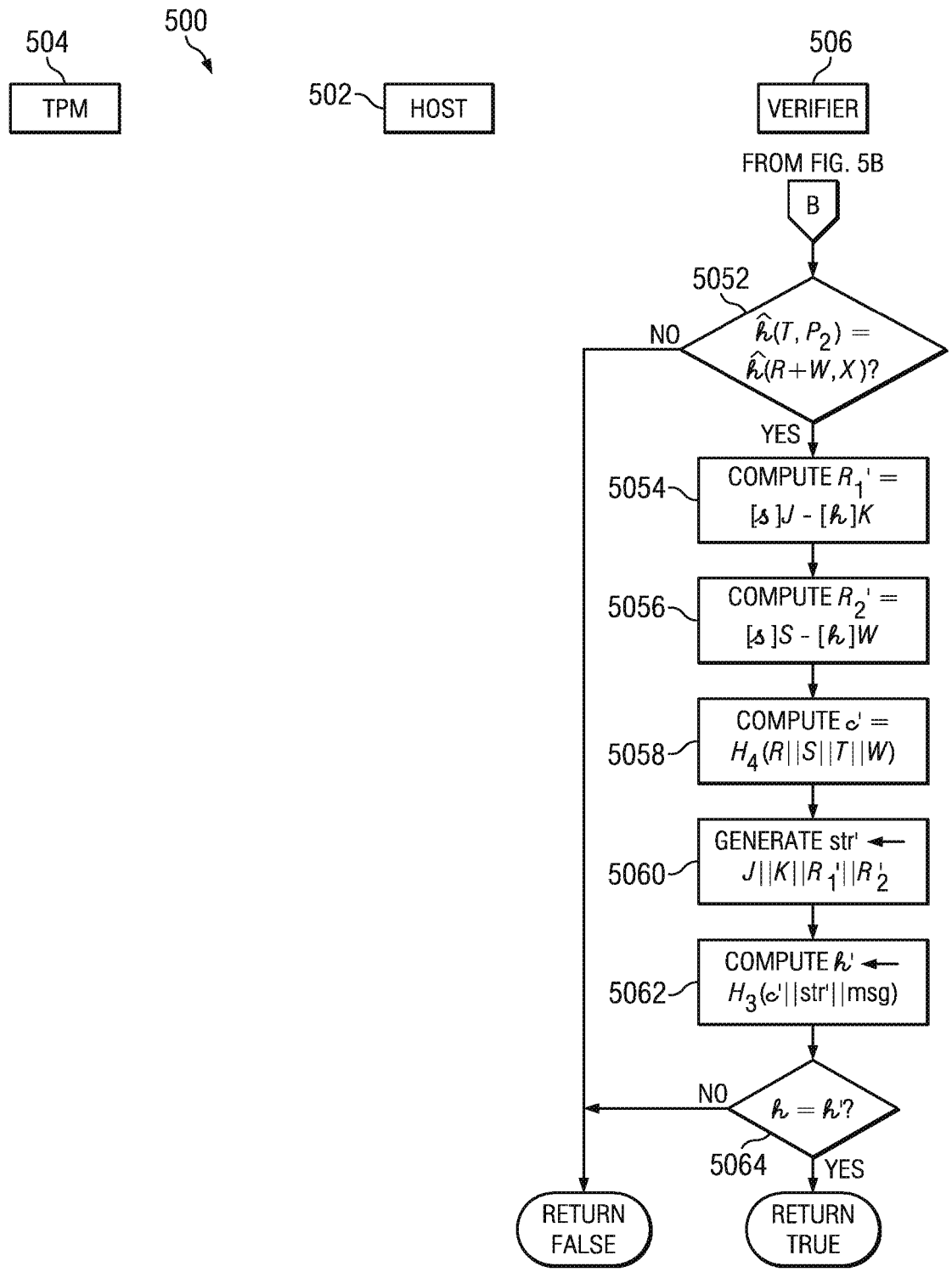

FIGS. 5A-5C show a flowchart 500 that illustrates aspects of an example DAA sign process of a DAA scheme. The process illustrated in the flowchart 500 of FIGS. 5A-5C is performed by a host computer 502 and TPM 504 of a DAA signer (e.g., host computer 104 and TPM 106 of FIG. 1) and a DAA verifier 506 (e.g., DAA verifier 108 of FIG. 1) after the public parameters for the DAA scheme have been established, for example via performance of the processes illustrated in the flowcharts 300, 320, 340, and 350 of FIGS. 3A, 3B, 3C, and 3D, respectively, and after the host computer 502 and its associated TPM 504 have completed a DAA join process of the DAA scheme, for example via performance of the process illustrated in the flowchart 400 of FIGS. 4A-4E.

At 5002, host computer 502 checks the value of the base name (e.g., an arbitrary string or a special symbol) to see if bsn=⊥. If host computer 502 determines that bsn=⊥, host computer 502 proceeds to 5004, where host computer 502 selects base name point J at random from $\mathbb{G}_1$. In contrast, if host computer 502 determines that bsn≠⊥, host computer 502 proceeds instead to 5006, where host computer 502 computes the value for base name point J by applying hash function H$_1$ to bsn. Thereafter, host computer 502 selects a value l at random from $\mathbb{Z}_q$ at 5008, computes a value R by multiplying the value selected for l by the value of A from the DAA credential at 5010, computes a membership point S by multiplying the value selected for l by the value of B from the DAA credential at 5012, computes a value T by multiplying the value selected for l by the value of C from the DAA credential at 5014, and computes a value W by multiplying the value selected for l by the value of D from the DAA credential at 5016. In addition, at 5018, host computer 502 computes c by performing hash function H$_4$ on (R||S||T||W). Then, at 5020, host computer 502 transmits c, J, S, and a message msg to TPM 504 and requests TPM 504 to execute a DAA sign protocol to sign the message msg. In some implementations, the message msg may have been provided to host computer 502 by DAA verifier 506.

TPM 504 receives c, J, S, and msg and sets about executing the DAA sign protocol to sign the message msg. In particular, at 5022, TPM 504 computes a signature K by multiplying sk$_T$ by J. Thereafter, TPM 504 selects a value r at random from $\mathbb{Z}_q$ at 5024, computes a value R$_1$ by multiplying r times J at 5026, and computes a value R$_2$ by multiplying r times S at 5028. Then, TPM 504 generates str by concatenating J, K, R$_1$, and R$_2$ at 5030.

Referring now to FIG. 5B, host computer 504, computes h by applying hash function H$_3$ to (C||str||msg) at 5032, computes s=r+h·sk$_T$(mod$_q$) at 5034, and generates a signature $\sigma_T$ by packaging K, h, and s together at 5036. Thereafter, at 5038, TPM 504 transmits the signature $\sigma_T$ to host computer 502.

Host computer 502 receives signature $\sigma_T$ and, at 5040, adds its own contribution to the DAA signature, generating DAA signature a by packaging R, S, T, W, J, K, h, and s together. Then, at 5042, host computer 502 transmits the DAA signature a to DAA verifier 506.

DAA verifier 506 receives DAA signature σ and then verifies the validity of DAA signature σ to authenticate host computer 502 and its associated TPM 504. In particular, at 5044, DAA verifier 506 checks to confirm that the DAA secret key held by TPM 504 is not known to have been compromised. In particular, for every DAA secret key sk'$_T$ included in a RogueList of DAA secret keys known to have been compromised, DAA verifier 506 checks whether the value of K from the DAA signature σ matches [sk'$_T$]J. If K=[sk'$_T$]J is true for any DAA secret key sk'$_T$ included in the RogueList of DAA secret keys known to have been compromised, DAA verifier 506 determines that the DAA secret key held by TPM 504 has been compromised and, therefore, declines to authenticate host computer 502 and its associated TPM 504. In contrast, if K=[sk'$_T$]J is false for all of the DAA secret keys sk'$_T$ included in the RogueList, DAA verifier 506 determines that the DAA secret key held by TPM 504 is not known to have been compromised and, therefore, DAA verifier 506 proceeds with the process.

At 5046, DAA verifier 502 checks if bsn=⊥. If DAA verifier 506 determines that bsn=⊥, DAA verifier 506 declines to authenticate host computer 502 and its associated TPM 504. In contrast, if host computer 502 determines that bsn≠⊥, DAA verifier 506 proceeds to 5048, where DAA verifier checks if J=H$_1$(bsn). If DAA verifier 506 determines that J≠H$_1$(bsn), DAA verifier 506 declines to authenticate host computer 502 and its associated TPM 504. In contrast, if DAA verifier 506 determines that J=H$_1$(bsn), DAA verifier 506 proceeds to 5050, where DAA verifier 506 checks if ĥ(R,Y)=ĥ(S,P$_2$). If ĥ(R,Y)≠ĥ(S,P$_2$), DAA verifier 506 determines that the DAA signature a is invalid and, therefore, declines to authenticate host computer 502 and its associated TPM 504. In contrast, if ĥ(R,Y)=ĥ(S,P$_2$), DAA verifier 506 proceeds with the process.

Referring now to FIG. 5C, at 5052, DAA verifier 506 checks if ĥ(T,P$_2$)=ĥ(R+W,X). If ĥ(T,P$_2$)≠ĥ(R+W,X), DAA verifier 506 determines that the DAA signature σ is invalid and, therefore, declines to authenticate host computer 502 and its associated TPM 504. In contrast, if ĥ(T,P$_2$)=ĥ(R+W, X), DAA verifier 506 proceeds to 5054, where DAA verifier 506 computes R'$_1$=[s]J−[h]K. In addition, at 5056, DAA verifier 506 computes R'$_2$=[s]S−[h]W, and, at 5058, DAA verifier 506 computes c' by applying hash function H$_4$ to (R||S||T||W). Then, DAA verifier 506 generates str' by concatenating J, K, R'$_1$, and R'$_2$ at 506, and computes h' by applying hash function H$_3$ to (c'||str'||msg) at 5062. Finally, at 5064, DAA verifier 506 checks if h (from DAA signature σ) matches h'. If h≠h', then DAA verifier 506 determines that the DAA signature σ is invalid and declines to authenticate host computer 502 and TPM 504. In contrast, if h=h', DAA verifier 506 determines that DAA signature σ is valid and DAA verifier 506 determines that host computer 502 and its associated TPM 504 are authentic.

Figure 6:
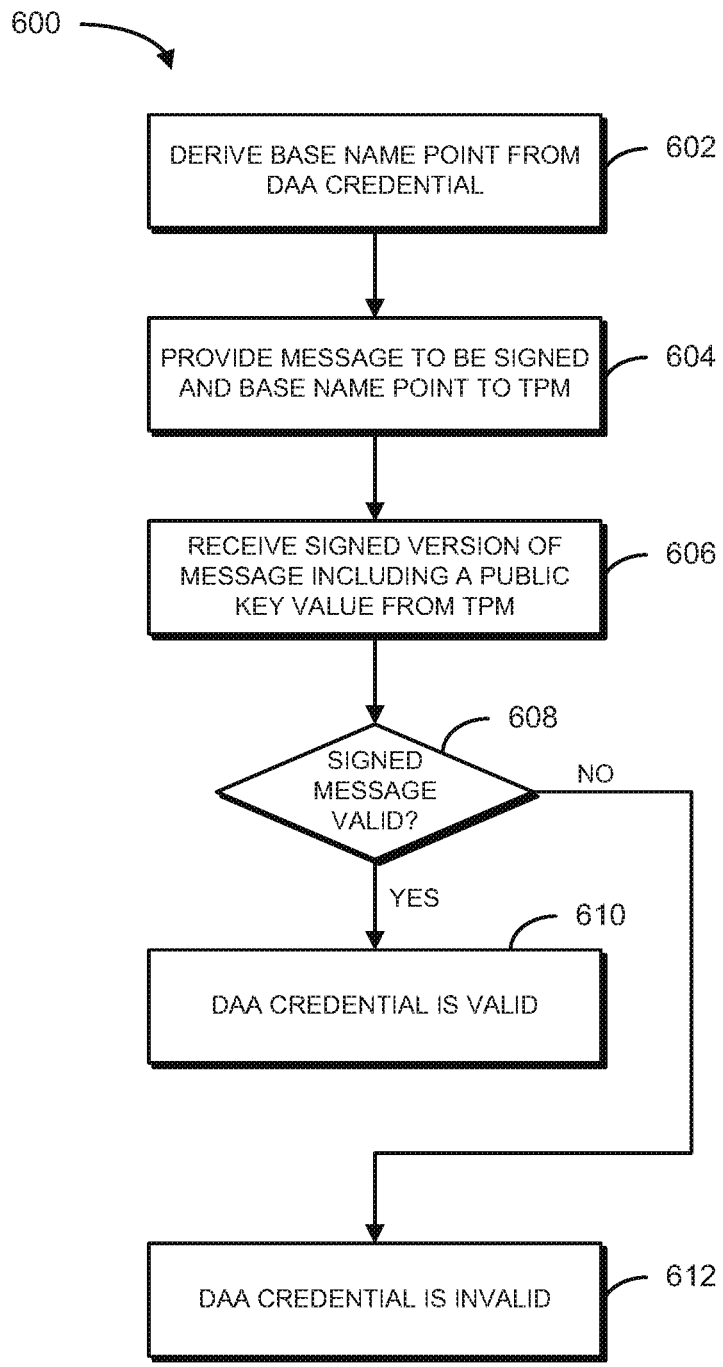

FIG. 6 is a flowchart 600 that illustrates aspects of an example DAA join process. In particular, the flowchart 600 of FIG. 6 illustrates actions that may be performed by a host computer (e.g., host computer 104 of FIG. 1) during a DAA join process in connection with verifying that a DAA credential received from a DAA issuer (e.g., DAA issuer 102 of FIG. 1) is valid and acquiring a randomizable public key that enables the host computer to contribute to a DAA signature computed by the host computer and its associated TPM (e.g., TPM 106 of FIG. 1).

As illustrated in FIG. 6, at 602, the host computer derives a base name point from the DAA credential received from the DAA issuer (e.g., as discussed above in connection with 4070 in FIG. 4D) and then, at 604, the host computer provides a message to be signed and the base name point to the TPM associated with the host computer (e.g., as discussed above in connection with 4074 of FIG. 4D). In response to providing the message to be signed and the base name point to its associated TPM, the host computer receives a signed version of the message including a public key value from its associated TPM at 606 (e.g., as discussed above in connection with 4092 of FIG. 4E). Then, at 608, the host computer determines if the signed message is valid (e.g., as discussed above in connection with 4094-4108 of FIG. 4E). If the signed message is valid, at 610, the host computer determines that the DAA received from the DAA issuer is valid. In contrast, if the signed message is invalid, at 612, the host computer determines that the DAA credential is invalid.

As described above, in one general aspect, a DAA credential is received from a DAA issuer computing system. A base name point then is derived from the DAA credential. A message and the base name point then are provided to a trusted platform module. A signature command also is issued to the trusted platform module requesting that the trusted platform module execute a signature routine to sign the message using the base name point as input to the signature routine. Thereafter, a version of the message signed by the trusted platform module and including a public key value associated with the base name point is received from the trusted platform module, and it is determined, based on the version of the message signed by the trusted platform module and the base name point, that the DAA credential is valid. The public key value is stored in computer-readable memory (e.g., that is external to the trusted platform module).

Implementations may include one or more of the following features. For example, the stored public key value may be designated as a public key value to be used to sign messages to be transmitted from the host computing device to a DAA signature verifier computing system in a DAA signature verification procedure (e.g., as a consequence of having determined that the DAA credential is valid). A challenge message to be signed as part of a DAA signature verification procedure to authenticate the host computing device may be received from a DAA signature verification computing system, and the signature command may be issued to the trusted platform module requesting that the trusted platform module execute the signature routine to sign the challenge message. In addition, a version of the challenge message signed by the trusted platform module may be received from the trusted platform module, the stored public key value may be incorporated into the version of the challenge message signed by the trusted platform module, and the version of the challenge message signed by the trusted platform module and incorporating the stored public key value may be transmitted to the DAA signature verification computing system. Furthermore, in some implementations, deriving the base name point from the DAA credential may include setting the base name point equal to a value specified in the DAA credential.

In another general aspect, a security device (e.g., a trusted platform module) stores a secret DAA signing key and is configured to sign messages using the secret DAA signing key and a base name point. In addition, a host computing device is configured to store a DAA credential, derive a base name point from the stored DAA credential, provide a message to be signed and the base name point to the security device, receive, from the security device, a version of the message signed by the security device and including a public key value associated with the base name point, and determine, based on the version of the message signed by the security device, that the DAA credential is valid.

Implementations may include one or more of the following features. For example, the host computing device may include a housing, and the trusted platform module may be housed within the housing of the host computing device. Furthermore, the host computing device may include a motherboard, and the trusted platform module may be integrally coupled to the motherboard of the host computing device. Additionally or alternatively, trusted platform module may include physical mechanisms protecting the security of the secret DAA signing key.

In still another general aspect, a DAA credential is received from a direct anonymous attestation (DAA) issuer computing system, a base name point is derived from the DAA credential, and a message, the base name point, and an elliptic curve group membership point are provided to a trusted platform module. A signature command also is issued to the trusted platform module requesting that the trusted platform module execute a signature routine to sign the message using the base name point and the elliptic curve group membership point as inputs to the signature routine. Thereafter, a version of the message signed by the trusted platform module and including a public key value associated with the base name point is received from the trusted platform module. It is then determined, based on the version of the message signed by the trusted platform module and the base name point, that the DAA credential is valid, and the public key value is stored in computer-readable memory.

In some implementations, determining that the DAA credential is valid based on the version of the message signed by the trusted platform module and the base name point may include determining that the discrete logarithms of the public key value and the base name point are equivalent.

A number of methods, techniques, systems, and apparatuses have been described. The described methods, techniques, systems, and apparatuses may be implemented in digital electronic circuitry or computer hardware, for example, by executing instructions stored in computer-readable storage media.

Apparatuses implementing these techniques may include appropriate input and output devices, a computer processor, and/or a tangible computer-readable storage medium storing instructions for execution by a processor.

A process implementing techniques disclosed herein may be performed by a processor executing instructions stored on a tangible computer-readable storage medium for performing desired functions by operating on input data and generating appropriate output. Suitable processors include, by way of example, both general and special purpose microprocessors. Suitable computer-readable storage devices for storing executable instructions include all forms of nonvolatile memory, including, by way of example, semiconductor memory devices, such as Erasable Programmable Read-Only Memory (EPROM), Electrically Erasable Programmable Read-Only Memory (EEPROM), and flash memory devices; magnetic disks such as fixed, floppy, and removable disks; other magnetic media including tape; and optical media such as Compact Discs (CDs) or Digital Video Disks (DVDs). Any of the foregoing may be supplemented by, or incorporated in, specially designed application-specific integrated circuits (ASICs).

Although the operations of the disclosed techniques may be described herein as being performed in a certain order and/or in certain combinations, in some implementations, individual operations may be rearranged in a different order, combined with other operations described herein, and/or eliminated, and the desired results still may be achieved. Similarly, components in the disclosed systems may be combined in a different manner and/or replaced or supplemented by other components and the desired results still may be achieved.

What is claimed is:

1. A non-transitory computer-readable medium storing instructions that, when executed by a host computing device, cause the host computing device to:
   derive, from a direct anonymous attestation (DAA) credential, a base name point;
   provide, to a trusted platform module embedded on the host computing device, a message and the base name point, the trusted platform module including computer storage for protecting security of a public key value associated with the base name point;
   receive, from the trusted platform module, a version of the message signed by the trusted platform module using the base name point, wherein the version of the message includes the public key value; and
   determine, based on the version of the message signed by the trusted platform module and the base name point, whether the DAA credential is valid.

2. The computer-readable medium of claim 1 further comprising instructions that, when executed by the host computing device, cause the host computing device to:
   designate the stored public key value as a public key value to be used to sign messages to be transmitted from the host computing device to a DAA signature verifier computing system in a DAA signature verification procedure.

3. The computer-readable medium of claim 2 wherein the instructions that, when executed by the host computing device, cause the host computing device to designate the stored public key value include instructions that, when executed by the host computing device, cause the host computing device to:
   designate the stored public key value as a public key value to be used to sign messages to be transmitted from the host computing device to a DAA signature verifier computing system in a DAA signature verification procedure in response to a determination that the DAA credential is valid.

4. The computer-readable medium of claim 2 further comprising instructions that, when executed by the host computing device, cause the host computing device to receive, from the trusted platform module, a version of a challenge message to be signed as part of a DAA signature verification procedure, wherein the version of the challenge message is signed by the trusted platform module.

5. The computer-readable medium of claim 2 further comprising instructions that, when executed by the host computing device, cause the host computing device to incorporate the stored public key value into a version of a challenge message to be signed as part of a DAA signature verification procedure, wherein the version of the challenge message is signed by the trusted platform module.

6. The computer-readable medium of claim 2 further comprising instructions that, when executed by the host computing device, cause the host computing device to:
   transmit to the DAA signature verification computing system a version of a challenge message to be signed as part of a DAA signature verification procedure, wherein:
   the version of the challenge message is signed by the trusted platform module; and
   the stored public key value is incorporated in the version of the challenge message signed by the trusted platform module.

7. The computer-readable medium of claim 1 further comprising instructions that, when executed by the host computing device, cause the host computing device to:
   receive, from a DAA signature verification computing system, a challenge message to be signed as part of a DAA signature verification procedure to authenticate the host computing device; and
   issue a signature command to the trusted platform module requesting that the trusted platform module execute a signature routine to sign the challenge message.

8. The computer-readable medium of claim 1 further including instructions that, when executed by the host computing device, cause the host computing device to store the public key value in computer-readable memory that is external to the trusted platform module.

9. The computer-readable medium of claim 1 wherein the instructions that, when executed by the host computing device, cause the host computing device to select the message independent from any input from any DAA signature verification computing system.

10. The computer-readable medium of claim 1 wherein deriving the base name point from the DAA credential includes setting the base name point equal to a value specified in the DAA credential.

11. A computing system comprising:
   a trusted platform module embedded on a host computing device and including computer storage for storing a direct anonymous attestation (DAA) signing key and a base name point; and
   the host computing device to:
   store a DAA credential;
   derive the base name point from the stored DAA credential; and
   determine, based on a version of a message signed by the trusted platform module using the base name point, whether the DAA credential is valid.

12. The system of claim 11, wherein the trusted platform module is a tamper-resistant chip.

13. The system of claim 11, wherein the trusted platform module is communicatively coupled to the host computer by low pin count bus interface.

14. The system of claim 11, further comprising a DAA issuer communicatively coupled to a DAA signer comprising the host computing device and the trusted platform module.

15. The system of claim 11 wherein:
   the host computing device includes a housing; and
   the trusted platform module is housed within the housing of the host computing device.

16. The system of claim 11 wherein:
the host computing device includes a motherboard; and
the trusted platform module is integrally coupled to the motherboard of the host computing device.

17. The system of claim 11 wherein the trusted platform module includes physical mechanisms protecting security of the DAA signing key.

18. A computer-implemented method comprising:
deriving, from a direct anonymous attestation (DAA) credential, a base name point;
providing, to a trusted platform module embedded on a host computing device, a message, the base name point, and a group membership point, the trusted platform module including computer storage for protecting security of a public key value associated with the base name point;
receiving, from the trusted platform module, a version of the message signed by the trusted platform module using the base name point and the group membership point, wherein the version of the message includes the public key value; and
determining, based on the version of the message signed by the trusted platform module and the base name point, whether the DAA credential is valid.

19. The method of claim 18 wherein determining whether the DAA credential is valid based on the version of the message signed by the trusted platform module and the base name point includes determining that the DAA credential is valid in response to determining that a discrete logarithm of the public key value and the base name point are equivalent.

20. The method of claim 18 wherein determining whether the DAA credential is valid based on the version of the message signed by the trusted platform module and the base name point includes determining that the DAA credential is invalid in response to determining that a discrete logarithm of the public key value and the base name point are not equivalent.

* * * * *